United States Patent
Qin et al.

(10) Patent No.: US 7,181,255 B2
(45) Date of Patent: Feb. 20, 2007

(54) ENCLOSURE FOR MOBILE PHONE WITH CHANGEABLE PANEL

(75) Inventors: Shui Yuan Qin, Shenzhen (CN); Baojiang Chen, Shenzhen (CN); Jiang Yuan He, Shenzhen (CN); Ying Liang Tu, Shenzhen (CN)

(73) Assignees: Shenzhen Futaihong Precision Ind. Co., Ltd., Shenzhen (CN); Sutech Trading Limited, Tortola (VG)

( * ) Notice: Subject to any disclaimer, the term of this patent is extended or adjusted under 35 U.S.C. 154(b) by 301 days.

(21) Appl. No.: 10/880,244

(22) Filed: Jun. 28, 2004

(65) Prior Publication Data

US 2004/0266498 A1 Dec. 30, 2004

(30) Foreign Application Priority Data

Jun. 27, 2003 (TW) .................................. 92211777

(51) Int. Cl.
*H04M 1/00* (2006.01)
*H04B 1/38* (2006.01)

(52) U.S. Cl. .................................... 455/575.1; 455/90.1
(58) Field of Classification Search ............. 455/575.1, 455/90.1, 90.2, 90.3, 550.1; 341/22, 173, 341/176, 20
See application file for complete search history.

(56) References Cited

U.S. PATENT DOCUMENTS

| 6,876,837 | B2 * | 4/2005 | Kuroshima et al. | ......... 455/90.3 |
| 7,015,834 | B2 * | 3/2006 | Maeda | ......................... 341/20 |
| 2004/0203496 | A1 * | 10/2004 | Bae et al. | .................. 455/90.1 |
| 2005/0014537 | A1 * | 1/2005 | Gammon et al. | ........ 455/575.1 |

* cited by examiner

*Primary Examiner*—Naghmeh Mehrpour
(74) *Attorney, Agent, or Firm*—Wei Te Chung

(57) ABSTRACT

An enclosure of a mobile phone with changeable panel includes a front cover (1), a panel (2), a rotatable holder (3), and a spring (4). The front cover defines a through hole (16) and latch slots (171, 172). The panel has projections (241, 242) at an edge thereof, and the projections can be engaged in the latch slots of the front cover. The panel further has a hole (25) corresponding to the through hole of the front cover. The holder has a latch portion (33), and the spring is engaged around the holder. The holder with the spring is received in the hole of the panel, and the holder is further received in the through hole of the front cover. The holder is rotated and the spring is compressed, thereby securely holding the panel on the front cover.

15 Claims, 5 Drawing Sheets

ENCLOSURE FOR MOBILE PHONE WITH CHANGEABLE PANEL

BACKGROUND OF THE INVENTION

1. Field of the Invention

This invention relates in general to a portable electronic device, and more specifically to an enclosure for a mobile phone.

2. Prior Art

Portable electronic devices, such as mobile phones, are widely used around the world. Many users like to change the aesthetic appearance of their mobile phones. Thus manufacturers are increasingly supplying mobile phones with changeable covers or panels.

A conventional enclosure for a mobile phone with a changeable panel is described in China Patent No. 96112975.1. The mobile phone includes a housing adapted to receive a faceplate as one of a plurality of faceplates. The faceplate has an outer surface with a distinctive aesthetic appearance, and an inner surface. The faceplate further includes a latch pin extending from the inner surface. The housing includes a front face having an aperture adapted to receive the latch pin, and includes a latch retainer configured to releasably engage the latch pin. When the latch retainer is in a released state, the faceplate may be readily removed and replaced. When the latch retainer is in a locked state, the faceplate is secured to the housing.

However, a user needs a special tool in order to release or to attach the faceplate. It is not convenient to change the faceplate. Moreover, the latch pin is easily disengaged from the locked state when the mobile phone is jarred or dropped.

A need therefore exists for a mobile phone having a panel that can be changed easily and that can be reliably held on a housing of the mobile phone.

SUMMARY OF THE INVENTION

In one aspect of the present invention, an enclosure of a mobile phone with a changeable panel comprises a front cover, a panel, a rotatable holder and a spring. The front cover defines a through hole and latch slots. The panel has projections at an edge thereof, and the projections can be engaged in the latch slots of the front cover. The panel further has a hole corresponding to the through hole of the front cover. The holder has a latch portion, and the spring is engaged around the holder. The holder with the spring is received in the hole of the panel, and the holder is further received in the through hole of the front cover. The holder is rotated and the spring is compressed, thereby securely holding the panel on the front cover.

Other objects, advantages and novel features of the invention will become more apparent from the following detailed description when taken in conjunction with the accompanying drawings, in which:

DETAILED DESCRIPTION OF THE INVENTION

Figure 1:
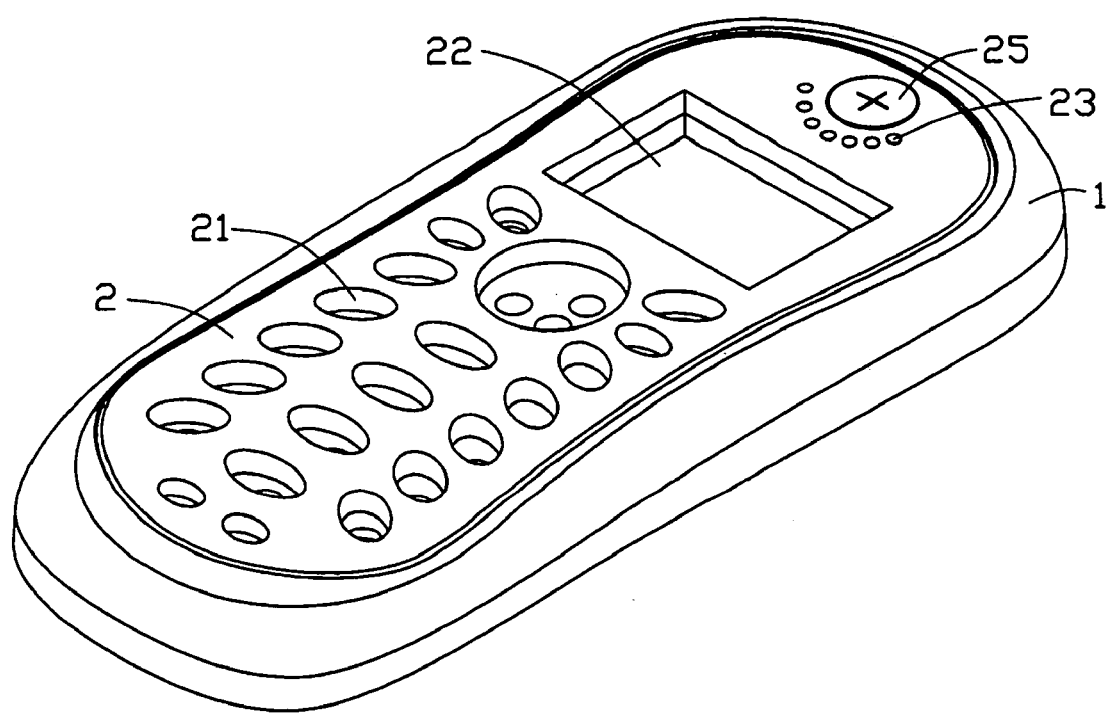
FIG. 1 is an isometric view of an enclosure for a mobile phone of the present invention.
Figure 2:
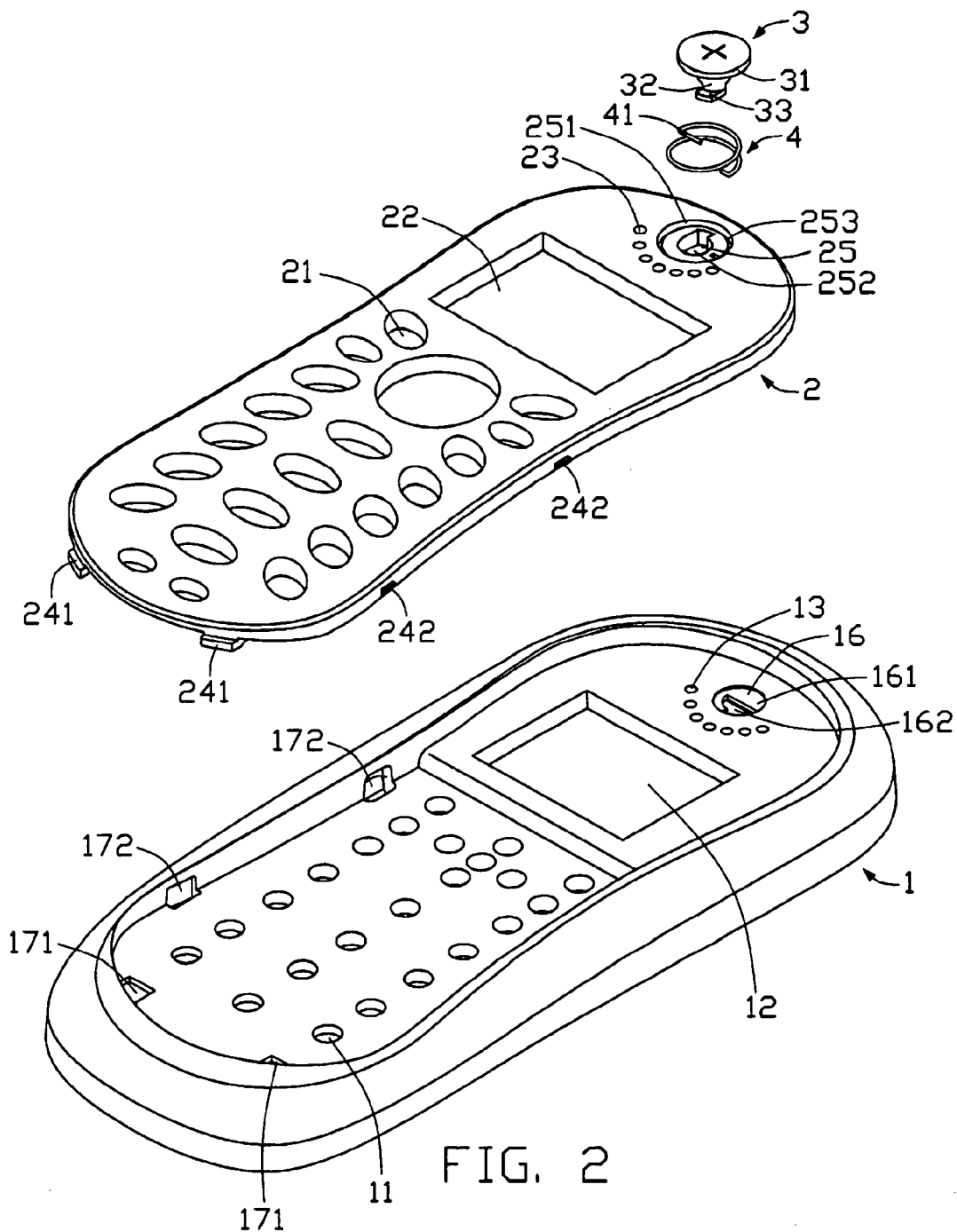
FIG. 2 is an exploded view of FIG. 1.

Referring to FIGS. 1 and 2, an enclosure for a mobile phone has a front cover 1, a panel 2, a rotatable holder 3, and a spring 4. The spring 4 is engaged around the holder 3, and the holder 3 is received in a hole 25 of the panel 2 and a through hole 16 of the front cover 1. The holder 3 thus holds the panel 2 on the front cover 1.

Figure 3:
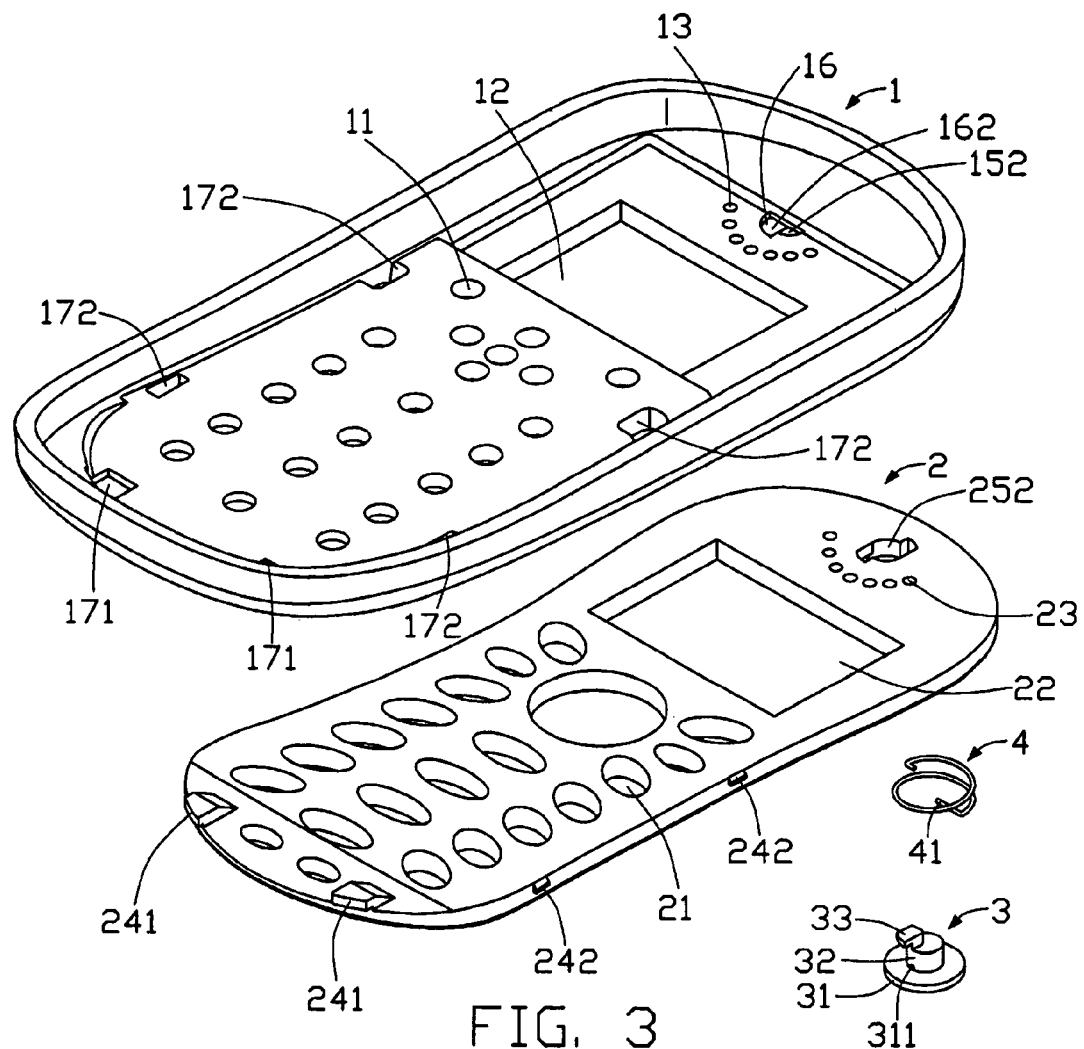
FIG. 3 is an inverted view of FIG. 2.

Referring also to FIG. 3, the front cover 1 has a plurality of keypad holes 11, a window 12, and a plurality of sound channels 13. The front cover 1 further has the through hole 16 and a plurality of latch slots 171, 172. The through hole 16 comprises a top cylindrical portion 161, and a through portion 162 defined through to a bottom surface of the front cover 1. A slot 152 is defined in the bottom surface of the front cover 1, in communication with the through portion 162. A latch portion 33 of the holder 3 can be received in the slot 152.

The panel 2 has a plurality of keypad holes 21, a window 22, and sound channels 23 corresponding to the sound channels 13 of the front cover 1. A plurality of projections 241, 242 is formed at a bottom edge of the panel 2, for inserting into the latch slots 171, 172 of the front cover 1. The panel 2 further has the hole 25 corresponding to the through hole 16 of the front cover 1. The hole 25 comprises a round slot 251, a central hole 252, and a groove 253. The central hole 252 is below the round slat 251. The groove 253 is defined in the panel 2 around the round slot 251. The sound channels 23 are defined through the panel 2 around the hole 25. The sound channels 23 are in communication with respective sound channels 13 of the front cover 1 when the panel 2 is engaged with the front cover 1.

The holder 3 comprises a cap 31, a latch portion 33, and a shaft 32 interconnecting the cap 31 and the latch portion 33. A diameter of the cap 31 is slightly less than a diameter of the round slot 251, so the cap 31 can be rotatably received in the round slot 251. A spring-receiving hole 311 is defined in a top end portion of the shalt 32, for receiving an end portion 41 of the spring 4. Referring to FIGS 3–6, in particular, it can be seen that the latch portion 33, the through hole 162, and the slot 152 are sized such that the latch 33 is configured for insertion through the through hole 162 and for retention by the front cover 1 adjacent the slot 152.

The spring 4 is helical, and can be received in the groove 253 of the hole 25. An inner diameter of the spring 4 is greater than a diameter of the shalt 32, and less than the diameter of the cap 31. The spring 4 surrounds the shaft 32. The end portion 41 of the spring 4 is inserted into the spring-receiving hole 311.

Figure 4:
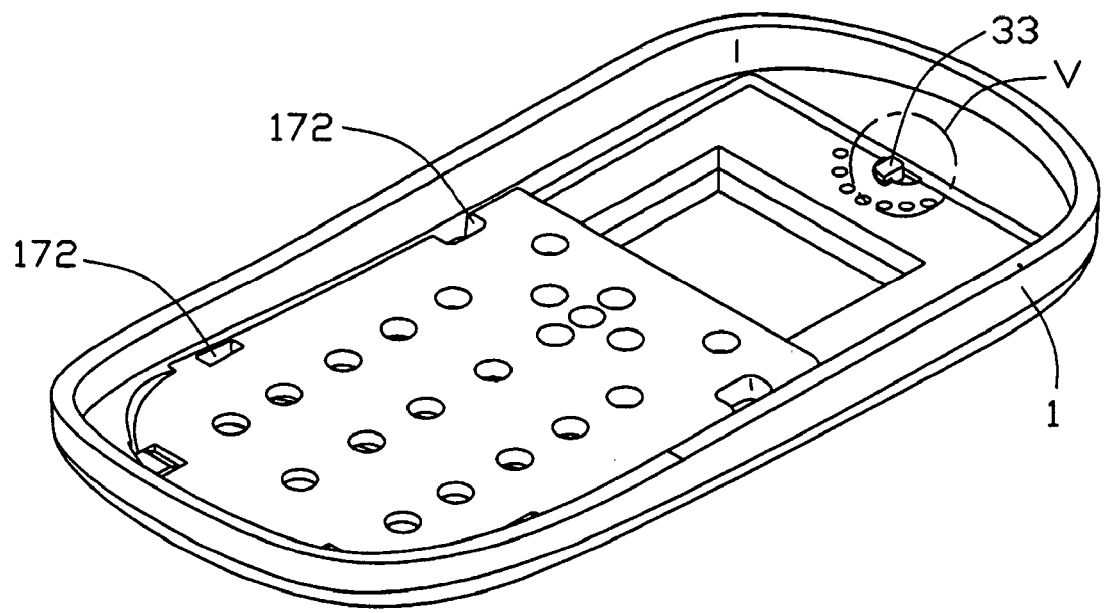
FIG. 4 is an inverted view of FIG. 1.
Figure 5:
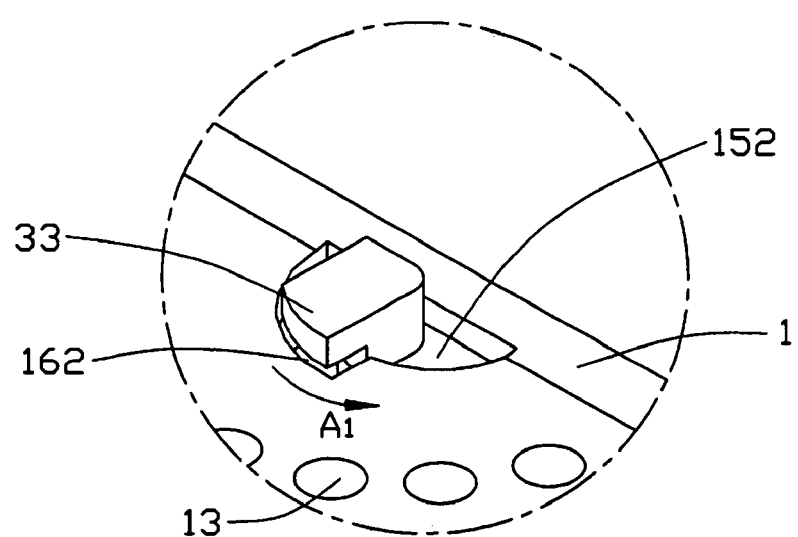
FIG. 5 is an enlarged view of a circled portion V of FIG. 4, showing a latch portion of a holder of the enclosure in an unlocked state.
Figure 6:
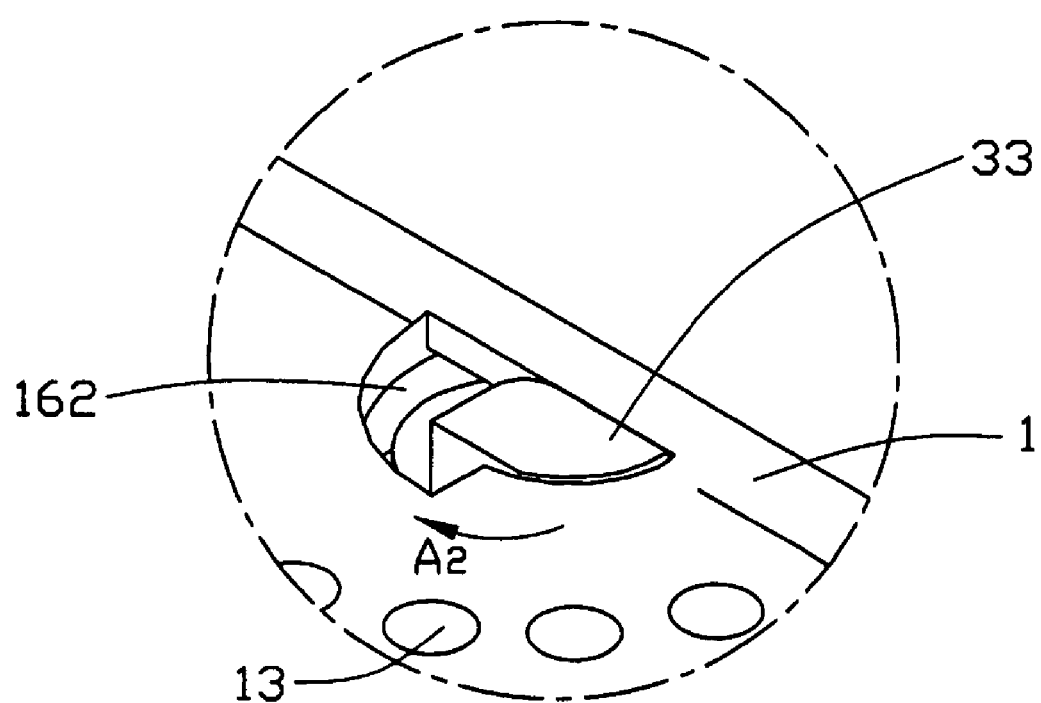
FIG. 6 is similar to FIG. 5, but showing the latch portion in a unlocked state.

Referring also to FIGS. 4–6, in assembly, the projections 241 of the panel 2 are firstly inserted into the latch slots 171 of the front cover 1. The panel 2 is pressed downwardly onto the front cover 1 until the projections 242 are received into the latch slots 172. The holder 3 with the spring 4 is received in the hole 25 of the panel 2. In particular, the cap 31 of the holder 3 is received in the round slot 251 of the hole 25. At the same time, the spring 4 is secured in the groove 253. The shaft 32 and the latch portion 33 of the holder 3 are received through the central hole 252 of the panel 2 and the through hole 16 of the front cover 1 (see FIG 5). The cap 31 is pressed downwardly, and the cap 31 is rotated in direction Al about 90 degrees. The latch portion 33 of the holder 3 is thus held in the slot 152 of the front cover 1 (see FIG. 6), and cooperates with the compressed spring 4 to securely hold the panel 2 on the front cover 1.

If the user needs to change the panel 2, he/she can press the cap 31 downwardly to disengage the latch portion 33 from the bottom surface of the front cover 1. Then, the holder 3 is rotated about about 90 degrees in direction A2, so that the latch portion 33 is disengaged from the slot 152 and corresponds to the hole 162. The holder 3 thus springs up from the panel 2 and the front cover 1 under elastic decompression force of the spring 4. The user lifts up the end of the panel 2 at the hole 25. The projections 241, 242 are then disengaged from the latch slots 171, 172. The panel 2 can thus be changed.

It is to be noted that the detailed description provided above should be considered as exemplary of the invention, and not restrictive of the invention as claimed hereinafter.

What is claimed is:

1. An enclosure for a mobile phone, comprising:
   a front cover having a plurality of keypad holes and a window formed thereon, and defining a through hole;
   a panel having a hole corresponding to the through hole of the front cover;
   a rotatable holder having a latch portion; and
   a spring disposed around the holder, the spring resisting the panel and being configured for providing a force for automatically separating the holder from the front cover;
   wherein the holder and the spring are received in the hole of the panel; the holder is further received in the through hole of the front cover; when the holder is rotated to a predetermined degree, the latch portion is engageable with the front cover and cooperates with the spring to hold the panel on the front cover; and when the holder is rotated to a reverse corresponding degree, the spring brings the latch portion to fall out from the front cover.

2. The enclosure for a mobile phone as set forth in claim 1, wherein the through hole comprises a cylindrical portion and a through portion defined through to a bottom surface of the front cover, the holder further includes a cap and a shaft, the shaft interconnecting the cap and the latch portion, the shaft passing through the through portion.

3. The enclosure for a mobile phone as set forth in claim 2, wherein the bottom surface of the front cover defines a slot in communication with the through hole, the latch portion being releasably received in the slot.

4. The enclosure for a mobile phone as set forth in claim 1, wherein the holder further comprises a cap and a shaft, and the shaft interconnects the cap and the latch portion.

5. The enclosure for a mobile phone as set forth in claim 4, wherein the hole of the panel comprises a round slot and a central hole below the round slot, a diameter of the cap being less than a diameter of the round slot, the cap being rotatably receivable in the round slot.

6. The enclosure for a mobile phone as set forth in claim 5, wherein the hole of the panel comprises a groove around the round slot, the spring being received in the groove.

7. The enclosure for a mobile phone as set forth in claim 4, wherein a spring-receiving hole is defined in a top end portion of the shaft, an end of the spring being received in the spring-receiving hole of the shaft.

8. An enclosure for a mobile phone, comprising:
   a front cover defining a first hole and a slot the first hole being in communication with the slot;
   a panel positioned on the front cover, the panel having a second hole corresponding to the through hole of the front cover; and
   a holder having a shaft and a latch portion, the latch portion radially extending from the shaft at one end thereof;
   wherein the latch portion, the first hole, and the slot are sized such that the latch is arranged and structured for insertion through the first hole and for retention by the slot; the holder is received in the second hole of the panel and the first hole of the front cover, the latch portion releasably locking with the front cover adjacent the slot therein so as to hold the panel on the front cover.

9. The enclosure for a mobile phone as set forth in claim 8, wherein a size of the latch portion corresponds to that of the first hole for allowing the latch portion to pass through the first hole, and a size of the slot is smaller than that of the latch portion for retaining the latch portion upon the front panel adjacent the slot.

10. The enclosure for a mobile phone as set forth in claim 9, wherein the holder is engaged in the first hole of the front cover, and the holder is rotated to a predetermined degree for locking the latch portion relative to the slot of the front cover.

11. The enclosure for a mobile phone as set forth in claim 8, the holder further includes a cap, the shaft interconnecting the cap and the latch portion.

12. The enclosure for a mobile phone as set forth in claim 11, wherein the second hole of the panel comprises a round slot and a central hole below the round slot, a diameter of the cap being less than a diameter of the round slot, the cap being rotatably receivable in the round slot.

13. The enclosure for a mobile phone as set forth in claim 8, further comprising a spring, wherein the spring is disposed around the holder, the spring resisting the panel and being configured for providing a force for automatically separating the holder from the front cover.

14. The enclosure for a mobile phone as set forth in claim 13, wherein the second hole of the panel includes a round slot and a groove, the groove is around the round slot, and one end of the spring being received in the groove.

15. The enclosure for a mobile phone as set forth in claim 14, wherein a spring-receiving hole is defined in a top end portion of the shaft, the other end of the spring being received in the spring-receiving hole of the shaft.

* * * * *